(12) United States Patent
Horky et al.

(10) Patent No.: US 9,389,076 B2
(45) Date of Patent: *Jul. 12, 2016

(54) COMMUNICATION PROTOCOL FOR REMOTELY CONTROLLED LASER DEVICES

(75) Inventors: John K. Horky, Lutherville, MD (US); Geoffrey S. Howard, Columbia, MD (US); James P. Bascom, Bel Air, MD (US); Stamati Arakas, Baltimore, MD (US); Gabriel E. Concari, Eldersburg, MD (US); Gary Noffke, York, PA (US)

(73) Assignee: BLACK & DECKER INC., New Britian, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/451,626

(22) Filed: Apr. 20, 2012

(65) Prior Publication Data

US 2012/0206244 A1 Aug. 16, 2012

Related U.S. Application Data

(62) Division of application No. 12/170,463, filed on Jul. 10, 2008, now Pat. No. 8,269,612.

(51) Int. Cl.
  *G05B 11/01* (2006.01)
  *G01C 15/00* (2006.01)
(52) U.S. Cl.
  CPC .................................. *G01C 15/002* (2013.01)
(58) Field of Classification Search
  CPC ........................... G08C 19/28; G07C 9/00182
  USPC ......................................................... 340/12.22
  See application file for complete search history.

(56) References Cited

U.S. PATENT DOCUMENTS

| | | | | |
|---|---|---|---|---|
| 5,541,695 A * | 7/1996 | Teremy et al. | | 396/59 |
| 6,633,227 B1 * | 10/2003 | Schmitz | | 340/10.31 |
| 7,123,636 B2 * | 10/2006 | Yamazaki et al. | | 372/38.07 |
| 7,183,947 B1 * | 2/2007 | Boveja et al. | | 340/945 |
| 2001/0045983 A1 * | 11/2001 | Okazaki et al. | | 348/211 |
| 2005/0057699 A1 * | 3/2005 | Bowser | | 348/734 |
| 2009/0111454 A1 * | 4/2009 | Jancic et al. | | 455/420 |

* cited by examiner

*Primary Examiner* — Vernal Brown
(74) *Attorney, Agent, or Firm* — Michael Aronoff

(57) ABSTRACT

A laser device operating system includes a laser device generating a laser beam when receiving a remote control unit command signal. The remote control unit operates in a public or private mode. In public mode the remote control unit generates a command signal transmitted to the laser device. In private mode the remote control unit generates a unique identifier prepended to the command signal. The laser device operates in a laser device public or private mode. In public mode the laser device responds to the remote control unit command signal or the command signal if transmitted by a second remote control unit. In private mode the laser device operates only upon receipt of the command signal and unique identifier, preventing laser device operation by the second remote control unit if the second unit does not include the unique identifier with the command signal.

8 Claims, 7 Drawing Sheets

COMMUNICATION PROTOCOL FOR REMOTELY CONTROLLED LASER DEVICES

FIELD

This application is a divisional of U.S. patent application, Ser. No. 12/170,463, filed Jul. 10, 2008; the entire contents of which are hereby incorporated by reference. The present disclosure relates to remotely controllable laser devices and methods for controlling remotely controllable laser devices.

BACKGROUND

The statements in this section merely provide background information related to the present disclosure and may not constitute prior art.

Laser devices such as laser levels have been used in construction for many years. They typically seek to produce a plane of light for a reference for construction projects. Laser levels have been used for large and small scale construction projects like commercial excavating, laying foundations, framing, plumbing, and installation of drop ceilings. Laser levels save considerable time during layout of construction jobs compared to other tools such as beam levels, chalk lines, or torpedo levels.

Job sites can often have multiple trades working simultaneously, each using their own laser level. Because laser levels can be remotely operated, a situation can exist when the remote control unit from one group can inadvertently change the operating parameters of one or more of the other laser levels. Also, because the laser level(s) can be positioned remotely at significant distance from their operator(s), each time the laser level must be reprogrammed, if it stops generating due to a fault condition, if the unit needs to be turned off for a change of work shift or lunch period, or if the operator forgets to turn the unit off, the operator must physically access the unit to change its operating state.

SUMMARY

According to several embodiments a laser device operating system includes a laser device adapted to generate a laser beam upon receipt of a command signal from a remote control unit. The remote control unit is selectively operable in each of a public mode and a private mode. In the public mode the remote control unit generates a command signal for wireless transmission to the laser device. In the private mode the remote control unit is further operable to generate a unique identifier appendable to the command signal. The laser device is further adapted to be operable in each of a laser device public mode and a laser device private mode. In the laser device public mode the laser device is adapted to respond to the command signal from the remote control unit or the command signal if transmitted by a second remote control unit. In the laser device private mode the laser device is adapted to operate only in response to receipt of both the command signal and the unique identifier, preventing operation of the laser device by the second remote control unit if the second remote control unit does not include the unique identifier with the command signal.

According to other embodiments, a laser device operating system includes a remote control device selectively operable in a public mode to transmit a command signal and in a private mode to transmit both the command signal and an identification number. A laser device is adapted to receive the command signal and the identification number. A copy of the identification number is stored in a memory of the laser device. The laser device is operable in a laser device public mode to perform an operation directed by the command signal. The laser device is operable in a laser device private mode to verify if the identification number transmitted by the remote control device matches the copy of the identification number and to perform an operation directed by the command signal only if the identification number matches the copy of the identification number.

According to still other embodiments, a system for remotely controlling a laser device, the system includes a laser device adapted to receive an operating command signal and to output a laser beam. A remote control device is operable to create the operating command signal and an infra-red beam and to transmit the operating command signal with an infra-red beam to the laser device. The remote control device has a mode selector button for selecting operation in at least two modes, a public mode and a private mode. In the private mode the remote control device is operable using a number generator to create an identification number and append the identification number to the operating command signal for transmission with the infra-red beam, and in the public mode is operable to transmit the operating command signal without the identification number. A memory of the laser device is operable to store a copy of the identification number. The laser device in the public mode is operable to perform an operation directed by the operating command signal without the identification number and is operable in the private mode to perform the operation directed by the operating command signal only if the identification number matches the identification number copy.

According to still other embodiments, a method for operating a laser device using an operating system comprises generating an infra-red beam in a first portable remote control unit; adding a command signal to the infra-red beam; transmitting the command signal to the laser device to initiate performance of an operation; and simultaneously depressing a first mode button on the laser device and a second mode button on the remote control unit to change from a first mode of both the laser device and the remote control unit wherein the laser device is operable to accept the command signal from both the first remote control unit and the at least one second remote control unit, to a second mode wherein the laser device is operable to accept the command signal only from the first remote control unit.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

Figure 1:
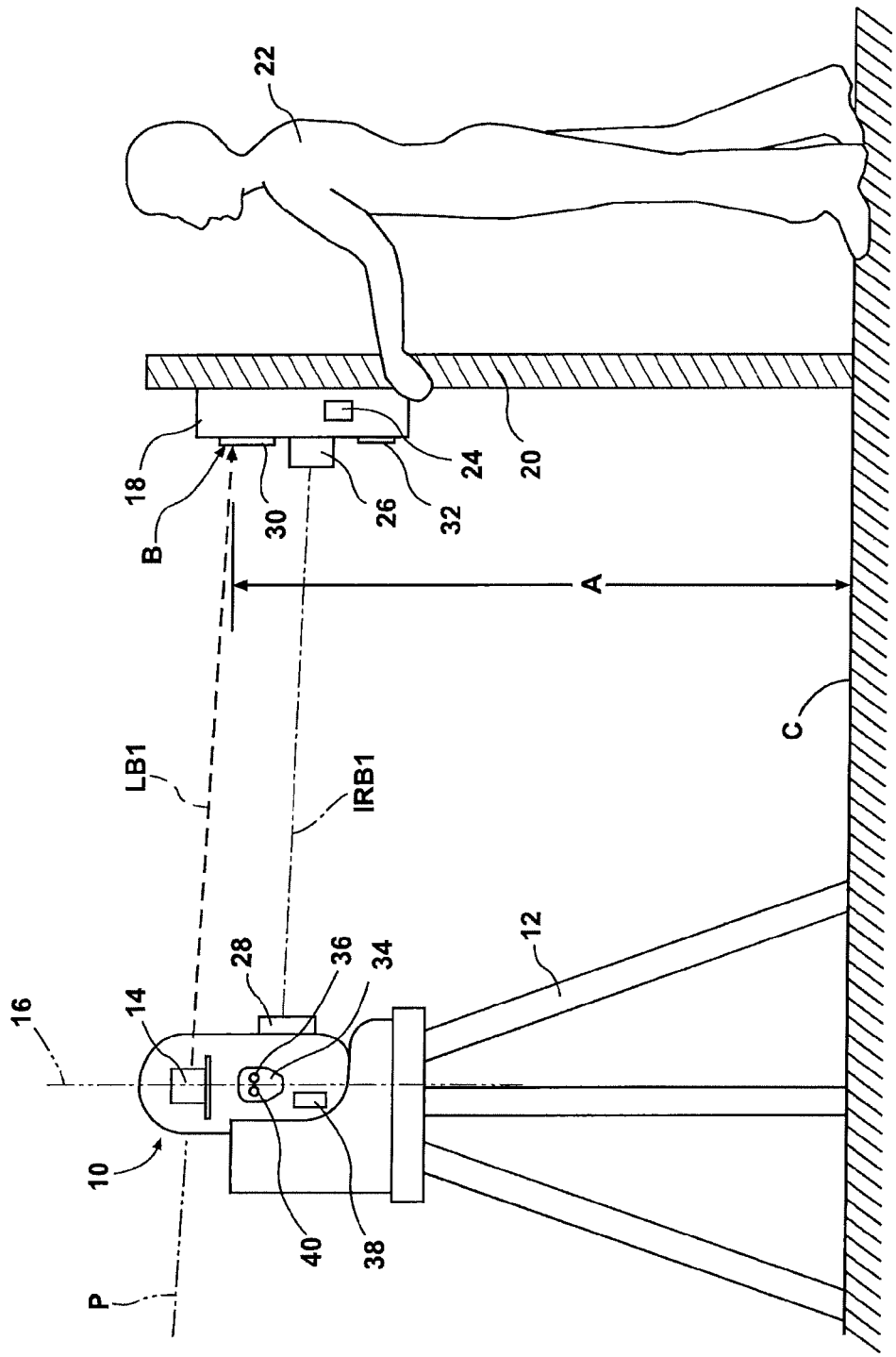
FIG. 1 is a front elevational view of a prior art configuration of a laser device of the present disclosure used in conjunction with a grade rod held by an operator.

The following description is merely exemplary in nature and is not intended to limit the present disclosure, application, or uses. It should be understood that throughout the drawings, corresponding reference numerals indicate like or corresponding parts and features.

Referring to FIG. 1, a laser device 10 of the present disclosure used for example as a laser level can be used in a common working environment by placing the laser device 10 on a tripod assembly 12. A laser generator 14 of laser lever 10 rotates around an axis 16 and emits a laser beam LB1 as a measuring light beam scanned in a plane "P". For most commercial applications, plane "P" is horizontal with respect to a ground surface. A light detector 18 adapted to receive the laser beam LB1 emitted from the laser device 10 can be attached to an upright face, such as a wall face, or a grade rod 20 held by a user or operator 22. The light detector 18 may be moved longitudinally (upwardly or downwardly as viewed in FIG. 1) along the grade rod 20 to detect a height "A" and a beam centered location "B" of a center of the laser beam LB1 flux with reference to a standard plane "C". The height "A" and the beam centered location "B" of the point or beam center to be measured are determined by measuring the height "A" and/or the beam centered location "B" of the light detector 18.

Alternatively, the standard horizontal plane "P" in which the laser beam LB1 is to be scanned is determined by appropriately marking the visually indicated center of the light flux of the laser beam LB1 striking the grade rod 20. A transmitter 24 of light detector 18 may have an infrared source 26 which converts the measurement signal into infrared light emitted as an Infrared Beam (IRB) 1. IRB1 is emitted towards laser device 10, which may be received by a receptor 28.

Laser light detectors 18 are constituted such that light rays are photoelectrically detected and a measurement result is displayed to measure an intensity of the received light, a light-projected location, and the like. A light-receiving section 30 for receiving the light and a display section 32 for displaying the measurement results on the basis of a signal from the light-receiving section 30 are ordinarily arranged together in the same plane. However, since the display section 32 for displaying the measurement result and the light-receiving section 30 are arranged in the same plane in the light detector 18, operator 22 may be required to stand exactly opposed to the display section to accurately read the measurement result to prevent the measuring light entering the light-receiving section being interrupted by the operator 22.

Laser device 10 can include a control panel 34 having a power button 36 operable when pushed and released to energize laser device 10 when laser device 10 has been completely powered down, following replacement of a power unit 38 such as a battery pack, or to "wake up" laser device 10 if laser device 10 is operating in a low power consumption "sleep" mode. At least one function button 40 is also provided to permit manual entry of an operating command for laser device 10.

Figure 2:
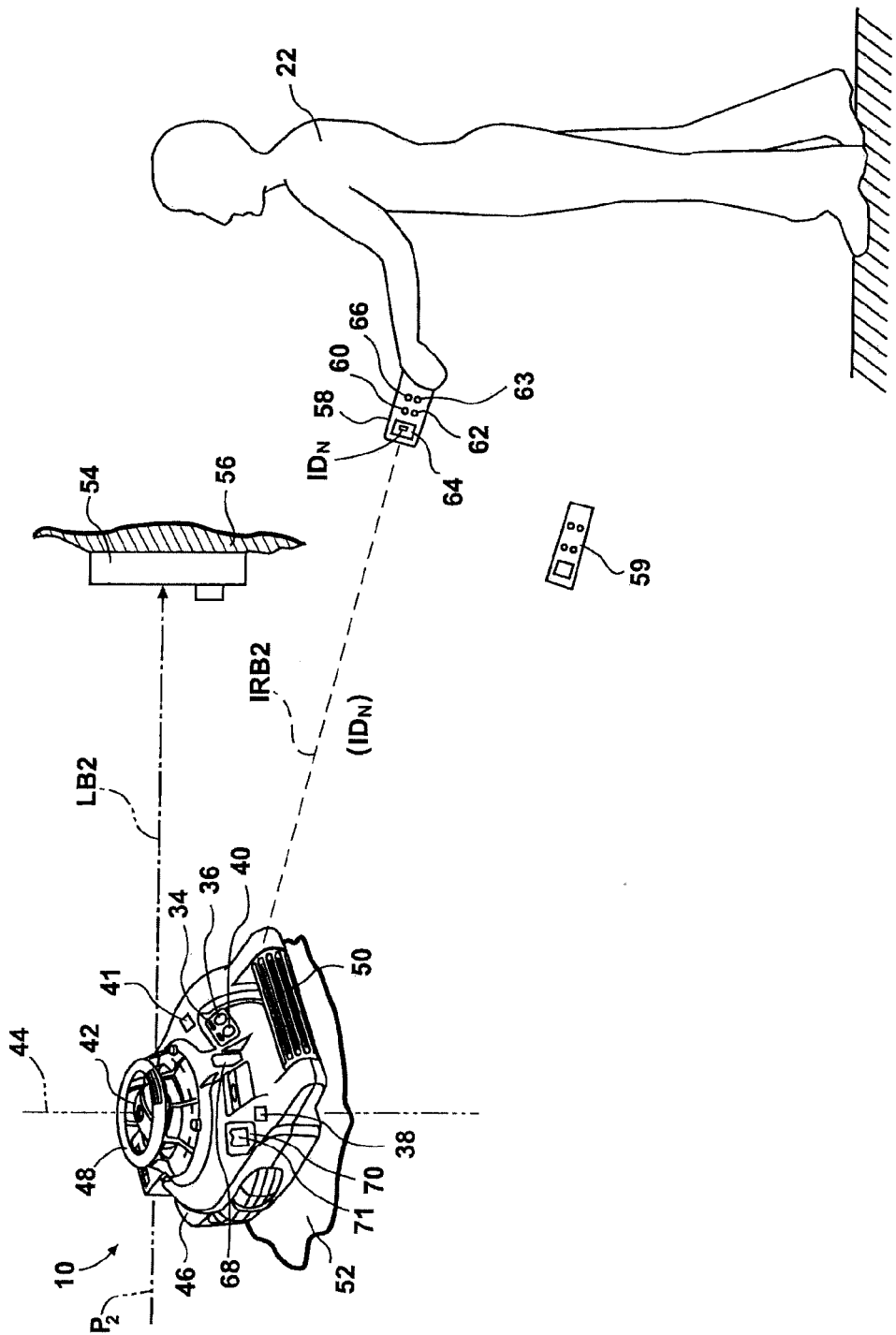
FIG. 2 is a front perspective view of a configuration of a laser device and remote control unit using the communication protocol for remotely controlled laser devices of the present disclosure.

Referring to FIG. 2, laser device 10 includes a laser diode assembly 42 that rotates about a rotational axis 44 and emits a laser beam LB2 as a measuring light beam scanned in a plane "$P_2$". Laser diode assembly 42 can be rotatably mounted to a body 46 of laser device 10 and can be protected from environmental damage using a diode assembly protective housing 48. Laser device 10 is manually portable and can therefore include a handle 50 extending from body 46. Laser device 10 can also be fixed or temporarily positioned with respect to a support item 52. Support item 52 can include a tripod assembly such as tripod assembly 12 described in reference to FIG. 1, structure of a building, a ground surface, or the like. Laser device 10 is located to provide an unobstructed path of laser beam LB2 to a laser light detector 54 remotely located from laser device 10 on a support item 56.

Laser device 10 can be locally operated using the power button 36 and the at least one function button 40 provided on control panel 34, and can also be remotely operated using a remote control unit 58. Remote control unit 58 is independently powered through use of a power unit 38 such as one or more batteries. A standby switch 60 is provided with remote control unit 58 to change to a standby operating state of laser device 10, and at least one button or function control switch 62 is provided to control operating functions of laser device 10.

According to additional embodiments, remote control unit 58 can also provide for selectable operating speed control for laser device 10. By adding one or more function control switches 63, function control switch(es) 62 can be designated to provide a first or slow speed change, for example to provide a fine control of the directional change speed or rotational speed of laser diode assembly 42. Use of function control switch(es) 63 can provide a second or high speed change, for example to reduce the time it takes to make course adjustments of the laser diode assembly 42, thus reducing the overall time to readjust laser device 10 for a new or modified operation. The function control switches 62, 63 can also be used in tandem, to first make a rapid or course adjustment followed by a slow speed or fine adjustment. Similar slow and fast speed control switches (not shown) can also be positioned on control panel 34 for manual control of laser device 10.

Remote control unit 58 is selectively operable in at least two operating modes including a "public" mode and a "private" mode. In the public mode remote control unit 58 generates and transmits a command signal to laser device 10, or to any other laser device that can recognize the command signal. In private mode, remote control unit 58 generates the command signal and can modify the command signal such that the laser device 10 can by adapted to distinguish a modified signal received from a specific one or ones of the remote control unit(s) 58. This can be accomplished such as by "encryption" of the command signal or otherwise protecting the command signal. Examples of encryption include but are not limited to prepending, postpending, or imbedding a code such as a code number, generating a random number to add to or modify the command signal, using a pseudo-random number or a rolling code, or using a fixed number that is transmitted with every command signal. Other methods of modifiying the command signal can include modifying a signal carrier frequency, using multiple signal carrier frequencies, modifying a wavelength of the signal, or using a unique combination of wavelengths for the signal. To broadly cover the above possibilities, each of the above methods for modifying the command signal are hereinafter collectively identified as providing the command signal modified to include an Identification Number $ID_N$, or more broadly a "unique identifier". According to the present disclosure, remote control unit 58 can function to only transmit the command signal, to selectively modify the command signal with the unique identifier, or to always transmit the command signal modified by the unique identifier.

Concomitantly, laser device 10 can be adapted to either receive and act on the command signal modified by the unique identifier, or be adapted to ignore the unique identifier. Laser device 10 can therefore operate in at least two operating modes. A first or "laser device public mode" of operation allows laser device 10 to receive commands manually entered via control panel 34, commands transmitted by remote control unit 58, or commands received by any of a plurality of remote control units 59 that are within the transmission range of laser device 10. In public mode, laser device 10 accepts un-modified command signals, or accepts modified command signals but ignores the unique identifier. The laser device public mode can be entered using any of the following steps:

1. Any time the power unit 38 is replaced or disconnected/re-connected, laser device 10 is subsequently energized in the public mode;
2. Entering a public mode command using one of the function buttons 40;
3. When an internal timer is not provided with laser device 10, each time laser device 10 is powered completely down and subsequently re-energized laser device 10 will automatically energize in public mode; or
4. When an internal timer 41 is provided with laser device 10, following a power down of laser device 10, if a predetermined period of time $T_1$ has elapsed before laser device 10 is re-energized, laser device 10 will automatically energize in the laser device public mode. According to several embodiments, predetermined period of time $T_1$ can be a fixed time interval such as four (4) hours or eight (8) hours.

The laser device public operating mode is additionally advantageous when it is desired that more than one remote control unit 58 be able to change an operation or state of laser device 10.

A second or "laser device private mode" of operation allows laser device 10 to receive commands manually entered via control panel 34, or to wirelessly receive commands transmitted by remote control unit 58 which include the unique identifier such as the Identification Number $ID_N$. When operating in laser device private mode, laser device 10 ignores any commands received from a second or other remote control units 59 that do not include the unique identifier. Laser device private mode can be entered by any of the following steps:

1. By entering a private mode command using a predetermined one of the function buttons 40 while simultaneously entering a private mode command using remote control unit 58; or
2. By entering a private mode command using only one of the function buttons 40 and not entering a private mode command using remote control unit 58. This option provides a "Remote Lock-Out Mode", wherein laser device 10 will ignore any command given by any remote control unit including remote control units 58 or 59 and will accept operating commands only by manual entry using control panel 34.

For entering a private mode command as described in the immediately preceding paragraph, when a selected one of the function buttons 40 is depressed and held for a period of approximately 4 to 8 seconds, and then released, laser device 10 enters a "learn" phase having a predetermined duration which according to several embodiments can be approximately 2 to 4 seconds wherein laser device 10 is adapted to receive and store a copy of the Identification Number $ID_N$ or unique identifier and thereafter laser device 10 is operational in laser device private mode. When the private mode command is selected for remote control unit 58, remote control unit 58 temporarily enters a "teach" phase wherein the Identification Number $ID_N$ or unique identifier is generated if necessary and repeatedly transmitted for a predetermined period which according to several embodiments can be approximately 2 to 4 seconds. Thereafter, according to several embodiments remote control unit 58 appends Identification Number $ID_N$ or modifies the command signal using the unique identifier for any command entered using remote control unit 58 with Identification Number $ID_N$ preceding the command or the or the unique identifier modifying the command. Once in laser device private mode, laser device 10 will read all received command signals but obey a command signal or change operational states only if a command signal having a command preceded by the Identification Number $ID_N$ or modified by the unique identifier is received. Laser device 10 will read and ignore all other command signals sent by remote control unit 58, or any other remote control units that are not modified by the unique identifier or do not include the Identification Number $ID_N$.

The laser device 10 must be commanded to leave the laser device public mode and enter the laser device private mode, and remote control unit 58 must be commanded to leave its public mode and enter its private mode. According to several embodiments, the remote control unit 58 generates and/or sends the unique identifier or adds the Identification Number $ID_N$ when operating in private mode but does not modify the signal using the unique identifier or generate and send the Identification Number $ID_N$ when operating in public mode. This allows remote control unit 58 to transmit commands in public mode which can be received by "legacy" or previously available laser devices (not shown) which may not have the capability to recognize the unique identifier or Identification Number $ID_N$ and would therefore be unresponsive to the modified command signals. Remote control units 58 can therefore be operable with laser devices other than laser devices 10 of the present disclosure.

For the Remote Lock-Out Mode described above, when laser device private operating mode is manually selected at the control panel 34 but a private mode command is not entered using remote control unit 58, the unique identifier (or the Identification Number $ID_N$) is not created or sent by remote control unit 58 or therefore stored by laser device 10. A portion of the command field stored in laser device 10 during operation in private mode, which normally includes the unique identifier or Identification Number $ID_N$ is therefore blank. No remote control unit signal received by laser device 10 will include a blank Identification Number $ID_N$ field. Therefore, laser device 10 will only accept manually entered commands at the control panel 34 for the duration of operation in Remote Lock-Out Mode.

According to several embodiments, the Identification Number $ID_N$ can be a unique number pre-assigned to remote control unit 58 and separate unique numbers individually assigned to each other remote control unit, or Identification Number $ID_N$ can be continuously or randomly internally generated by remote control unit 58. The operational command is modified by the unique identifier or has the Identification Number $ID_N$ prepended to the command defining a modified command 64. According to several embodiments, a private mode control switch 66 can be provided with remote control unit 58, which functions when depressed simultaneously with a corresponding button or switch on control panel 34 to change the operating mode of laser device 10 from the laser device public mode to the laser device private mode and to change the remote control unit 58 from the public to the private mode. There is no command signal or button provided with remote control unit 58 which directs laser device 10 to leave private mode and enter public mode.

When a function or command button is depressed and released, remote control unit 58 generates an Infrared Beam (IRB)2 which is transmitted to laser device 10. Laser device 10 includes a window 68 that receives IRB2 for transfer to a control system 70. Control system 70 directs the various functions of laser device 10 including transmission of LB2, control of an angle of dispersion of LB2, change of operating state, or change of operating mode. A comparator feature 71 provided with control system 70 can perform a comparator operation operable in the laser device private operating mode to verify for example if the Identification Number $ID_N$ of the command signal (IRB2) matches the copy of the Identification Number $ID_N$ saved in a laser device memory. In several embodiments of private mode operation, laser device 10 performs an operation directed by the operating command only if the Identification Number $ID_N$ matches the identification number copy stored in the memory.

Laser device 10 has several operating states, including, but not limited to: an "off" completely down-powered state, an "on" or laser generating state, and a sleep or "standby" state with laser diode assembly 42 down-powered and having laser device 10 energized at a minimum self sustaining level operable to remotely or manually locally receive a command. The standby state allows laser device 10 to receive input commands from remote control unit 58 required to energize laser device 10 to the on-state. Laser device 10 enters the standby state when laser device 10 is operational in the on-state but when laser device 10 has not received a command signal including an operating command for a predetermined period of time $T_2$.

According to several embodiments, the laser device 10 includes a plurality of buttons (including power button 36 and function button 40) and internal timer 41 continuously operable to establish a time period following a last actuation of any of the plurality of buttons. Laser device 10 is normally operable in the on-state for an undefined length of time period $T_3$ and continues operation in the on-state until directed to change states or until the power source power level falls to a predetermined level. When commanded to enter the standby-state laser device 10 produces no output of the laser beam LB2 from laser diode assembly 42. When the laser device 10 is operational in the standby state for the predetermined length of time $T_1$ (for example 8 hours) the laser device 10 automatically switches to the off-state. When the laser device 10 is operational in the standby state for less than the predetermined length of the time period $T_1$ (in this example less than 8 hours) and is energized to the on-state the laser device 10 automatically energizes in either the public mode or the private mode of operation that was operational prior to entering the standby state.

The private operating mode capability prevents all but one remote control unit 58 or only those remote control units 59 preset with or transmitting a command signal modified by the unique identifier or modified to add the Identification Number $ID_N$ from operating laser device 10. This feature can be used for example when multiple work groups are operating different laser devices in a common work area such as for example when separate groups are independently conducting grading, plumbing, and/or framing work on a construction site when operation of different laser devices set up for different uses would be undesirable using more than one or unidentified ones of the remote control units.

Figure 3:
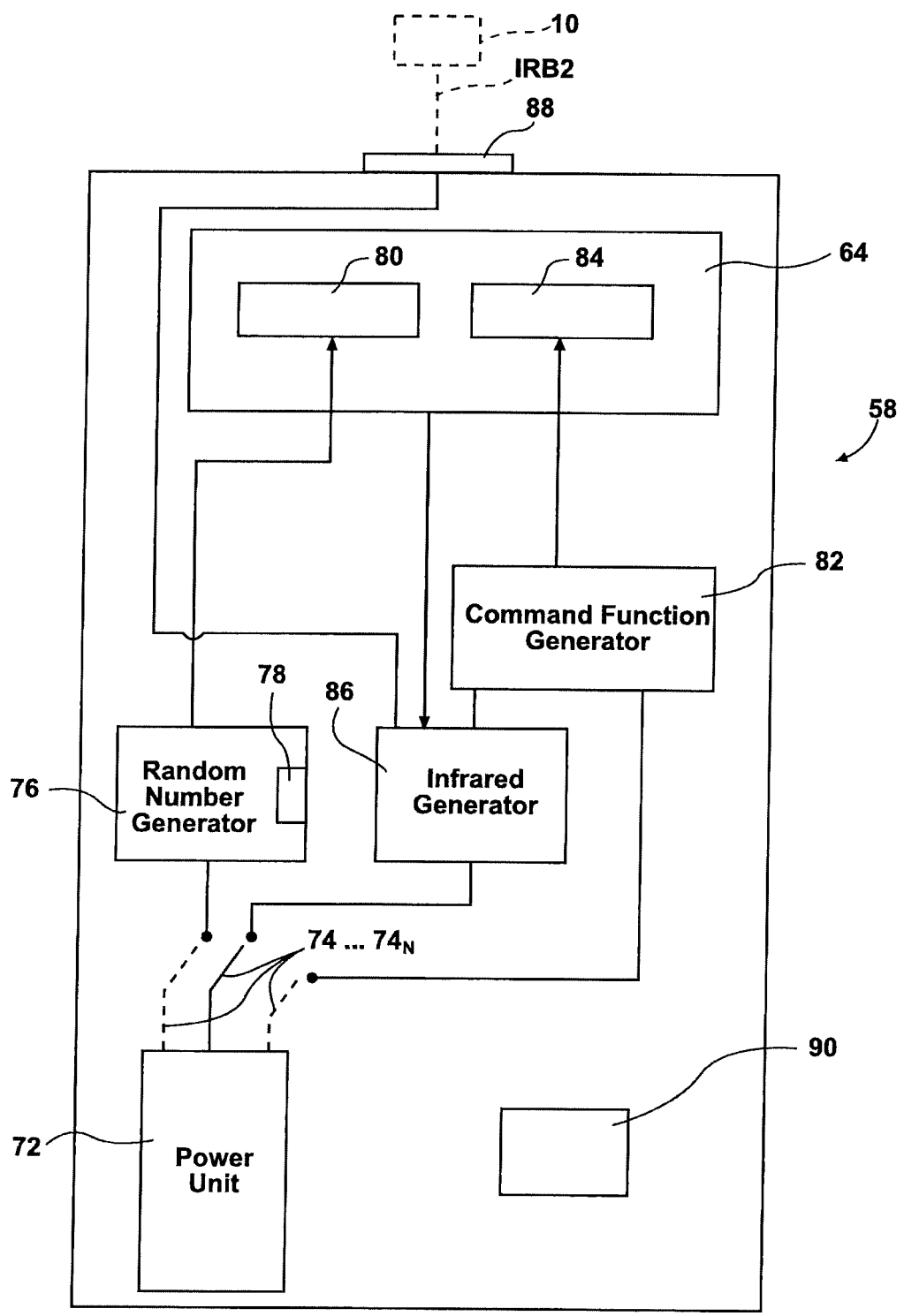
FIG. 3 is a block diagram of the remote control unit of FIG. 2.

Referring to FIG. 3, features of the remote control unit 58 include a power unit 72 which can be a single battery or a battery pack. Remote control unit 58 does not have an on-off switch to operate the remote control unit. Remote control unit 58, energized by power unit 72, continuously operates in a low power "sleep" mode until any one of a plurality of switches 74 . . . 74$_N$ are depressed, and automatically returns to the sleep mode after sending a command signal. Switches 74 . . . 74$_N$ include standby switch 60, function control switch 62 and private mode control switch 66 shown and described in reference to FIG. 2. According to several embodiments using Identification Number $ID_N$, a random number generator 76 generates either a single byte or a two-byte number that can serve as the Identification Number $ID_N$. Each time the remote control unit 58 is powered up following disconnection and/or replacement of power unit 72, if Identification Number $ID_N$ is not permanently stored, random number generator 76 creates a new Identification Number $ID_N$ which can vary from 1 to 256 for a one-byte generator, or from 1 to 65,536 for a two-byte generator and stores Identification Number $ID_N$ in a memory 78.

When a command is selected at remote control unit 58 with laser device 10 operating in private mode, the Identification Number $ID_N$ is provided to an ID number field 80 of modified command 64. A command function generator 82 creates one of a plurality of individual operating command signals for laser device 10 based on the switch or switches 74 . . . 74$_N$ depressed by the operator. The command selected by the operator is provided to a command function field 84 of modified command 64. The unique identifier modifies the command or the Identification Number $ID_N$ is appended to the command based on the command switch selected by the operator and modified command 64 is transmitted via infrared beam IRB2 generated by an infrared generator 86 through a transmission window 88 of the remote control unit 58.

Referring to both FIGS. 2 and 3, remote control unit 58 can be adapted such that the command signal modified by the unique identifier or the command signal with appended Identification Number $ID_N$ will be transmitted with every command transmitted from remote control unit 58 only when the remote control unit 58 is set to the private operating mode. According to other embodiments, remote control unit 58 can be adapted such that the command signal modified by the unique identifier or the command signal with appended Identification Number $ID_N$ will be transmitted with every command transmitted from remote control unit 58 in every operating mode. According to several embodiments, private mode control switch 66 and the corresponding button on control panel 34 of laser device 10 are not required to be separate or independent functioning switches or buttons on the remote control unit 58 or the control panel 34. Any of the existing switches or buttons on either of the remote control unit 58 and/or the control panel 34 can also serve to operate to select the private mode. A timer 90 provided with remote control unit 58 can also be used to automatically switch remote control unit 58 out of private mode and into public mode. Timer 90 restarts a time period count after each button push/release. For example only, timer 90 can be preset such that after an eight (8) hour time period has elapsed from the last switch push, timer 90 directs remote control unit 58 to return to public mode. This time period can be determined by the manufacturer. A subsequent switch push will wake up remote control unit 58 in public mode and will therefore not generate or send the unique identifier or Identification Number $ID_N$.

The switches 74 . . . 74$_N$ of remote control unit 58 can provide multiple uses as follows. Timer 90 is operable to determine a length of time that any switch is depressed. A momentary (less than 3 seconds) press/release functions to send the command associated with the switch. To accomplish a mode change, according to several embodiments pressing and holding the switch for at least four (4) seconds and up to approximately eight (8) seconds operates to substitute a change mode command signal from the switch. To avoid sending an unwanted command, each switch therefore functions not upon pressing, but upon release to allow signal transmission.

For purposes of determining a field length of the Identification Number $ID_N$ it is anticipated that job sites having more than one laser device in operation will not contain more than approximately four laser devices within the remote control range of each other. Therefore, the probability of any two remote control units having the same randomly generated Identification Number $ID_N$ will be low. This probability can be further reduced by the use of a two-byte random number generator for random number generator 76. If it is determined that a signal from a remote control unit operates an undesirable one of the proximate laser devices, the power unit 72 of the remote control unit 58 can be disconnected and/or removed and reinserted to cause a new unique identifier to be generated or to cause the random number generator 76 to create a new Identification Number $ID_N$. The laser device 10 can then be reprogrammed to restart in the laser device private mode and the newly created unique identifier or the newly generated Identification Number $ID_N$ will be saved in laser device 10.

Referring to FIG. 4 and again to FIG. 2, according to several embodiments control panel 34 includes power button 36 which when depressed and released changes the operating state of laser device 10 from the "off" to the "on" state or the opposite. A power LED indicator light 92 illuminates when laser device 10 is operational or periodically blinks if laser device 10 is in the standby-state. If for example laser device 10 is out-of-level, an X-axis leveling light 94 will flash and/or a Y-axis leveling light 96 will flash until laser device 10 automatically levels itself. A speed/rotation button 98 is pressed to adjust a rotation speed of laser diode assembly 42. First and second arrow buttons 100, 102 have multiple functions for a plurality of operating modes. In a self-leveling horizontal mode, first and second arrow buttons adjust a direction of the laser beam LB2. In a self-leveling vertical mode, first and second arrow buttons 100, 102 move the laser beam LB2 either left or right. In a manual mode, first and second arrow buttons 100, 102 adjust a tilt of laser diode assembly 42. A scan/mode button 104 operates when depressed/released to make the laser diode assembly sweep in a back and forth motion. A laser control panel LED 106 flashes to confirm laser device 10 has been placed in either private mode or remote lock-out mode (no-remote mode).

Figure 4:
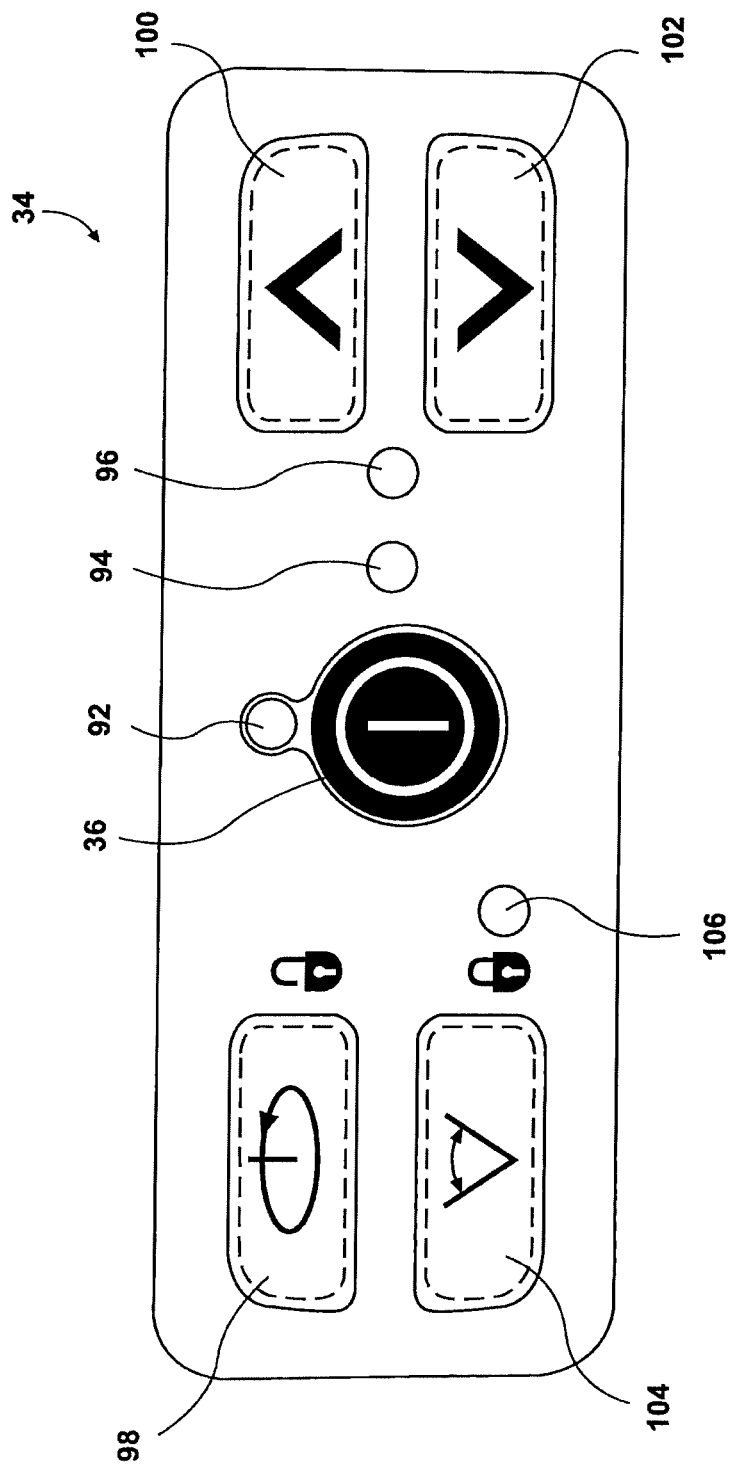
FIG. 4 is a front elevational view of a control panel for the laser device of FIG. 2.
Figure 5:
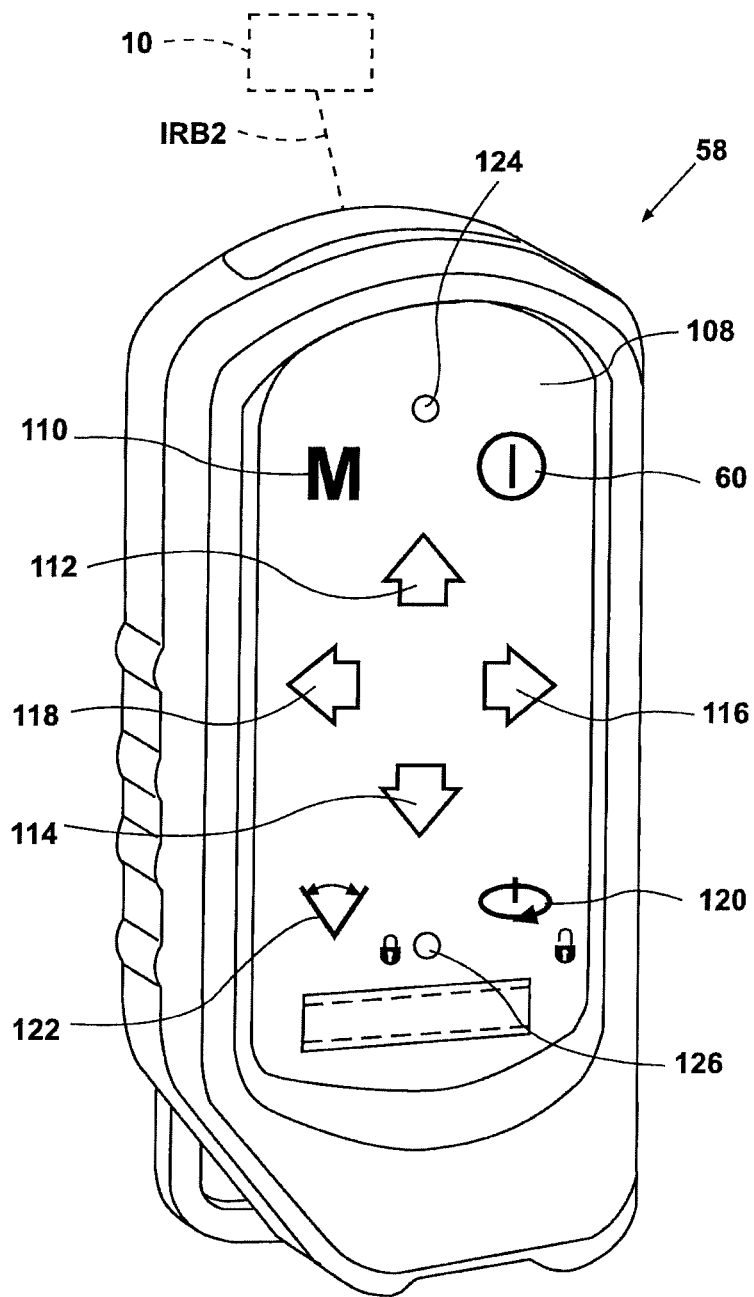
FIG. 5 is a front perspective view of the remote control unit of FIG. 2.

Referring to FIG. 5, according to additional embodiments remote control unit 58 can include a face 108 having multiple control features provided thereon. Remote control unit standby switch 60 as previously described operates when depressed and released to remotely switch laser device 10 into the standby state when laser device 10 is operating in either the public or private modes. A manual mode switch 110 when pressed for approximately three (3) seconds and released activates a manual mode of operation for laser device 10, during which time automatic leveling control of laser device 10 is deactivated. Pressing and holding manual mode switch 110 again for approximately three (3) seconds and releasing reactivates automatic leveling control. Up and down arrow switches 112, 114 and left and right arrow buttons 116, 118 have multiple functions similar to first and second arrow buttons 100, 102 described in reference to FIG. 4. A speed/rotation switch 120 is pressed to adjust a rotation speed of laser diode assembly 42. A scan/mode switch 122 can provide several operations. Scan/mode switch 122 can perform the same function as private mode control switch 66 described in reference to FIG. 2, which when depressed and held for a predetermined period of time and released will operate to place remote control unit 58 in the private mode. Scan/mode switch 122 can also perform additional functions, for example when depressed for less than the predetermined period of time and released to direct the laser diode assembly 42 to sweep in a back-and-forth motion. A transmit LED 124 flashes when remote control unit 58 transmits any command signal. A remote control private mode LED 126 flashes when remote control unit 58 enters the private mode.

Referring to both FIGS. 4 and 5, to place laser device 10 in private mode, scan/mode button 104 on control panel 34 is pressed and held for at least four (4) seconds while simultaneously pressing and holding scan/mode switch 122 of remote control unit 58. Laser device 10 will emit a beep noise and laser control panel LED 106 and private mode LED 126 of remote control unit 58 both flash to confirm private mode is entered. To place laser device 10 in remote lock-out mode, scan/mode button 104 is pressed and held for at least four (4) seconds then released, but scan/mode switch 122 of remote control unit 58 is not pressed. Laser device 10 will emit a beep noise and laser control panel LED 106 flashes to confirm remote lock-out mode is entered.

According to several embodiments and referring again to FIGS. 2 and 3, laser device 10 can also be operated as follows. Remote control unit 58 can have the Identification Number $ID_N$ permanently saved in memory 78 or can generate Identification Number $ID_N$ using random number generator 76 in each operation, and will therefore send Identification Number $ID_N$ with every transmission of a command signal. In these embodiments, laser device 10 will only operate in the laser device private mode and will ignore any command signal that does not include the Identification Number $ID_N$. The scan/mode switch 122 can either be eliminated or the additional function of scan/mode switch 122 to direct remote control device to enter private mode can be omitted from remote control unit 58 for these embodiments.

Figure 6:
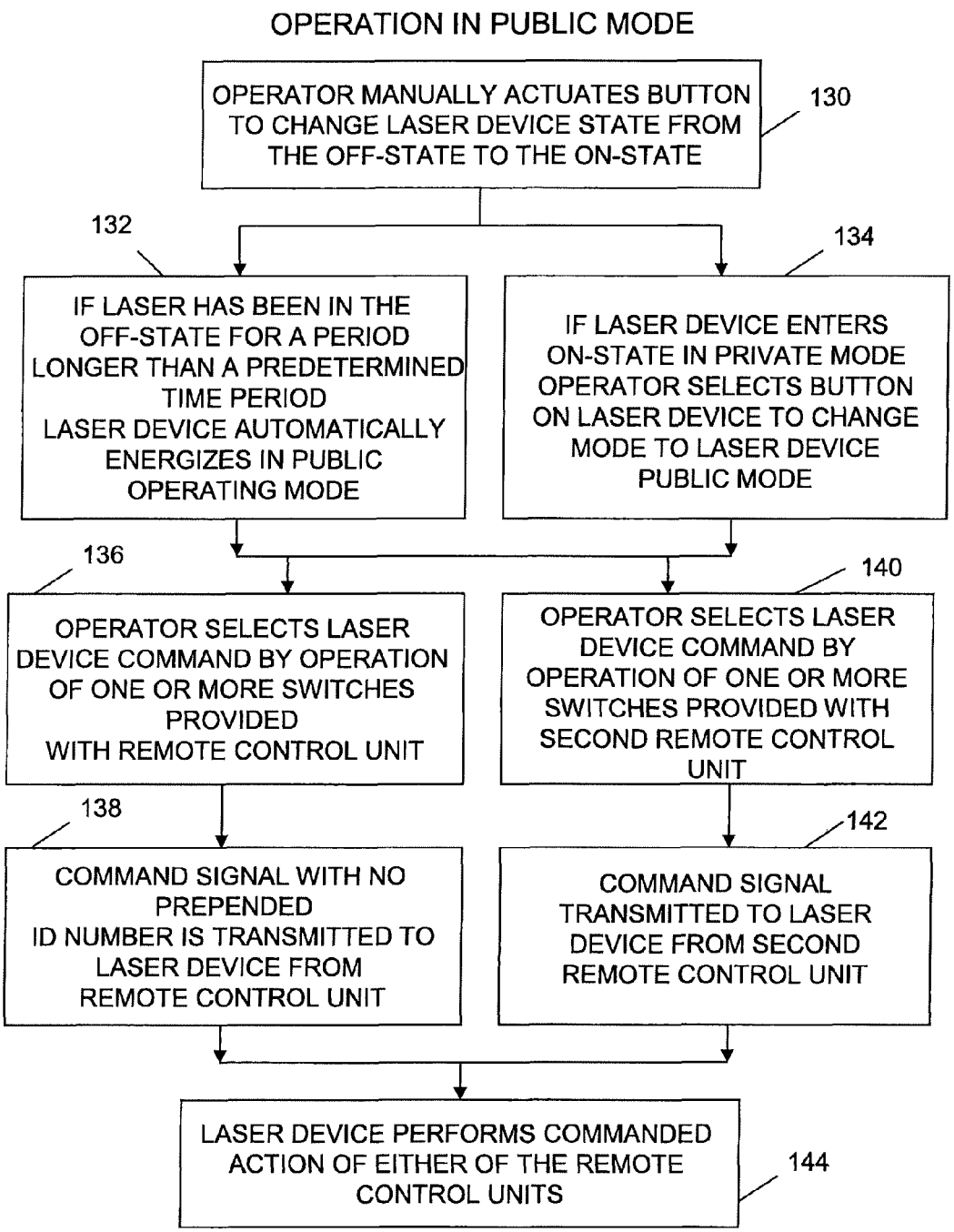
FIG. 6 is a diagram of operations performed in the public mode of operation.

Referring to FIG. 6, operation in the public mode can be accomplished as follows. In a first operation the operator manually actuates a laser device mounted button to change the laser device operating state from the off-state to the on-state. In a second operation 132 if the laser device has been in the off-state for a period of time longer than a predetermined period of time (for example longer than 8 hours), the laser device automatically energizes in the public mode. In a parallel operation 134, if the laser device energizes to the on-state in the private mode, the operator actuates a mode button on the laser device to change the mode of the laser device to the laser device public mode. In a command operation 136, with laser device in the laser device public mode the operator can select a laser device command by operation of one or more switches on the remote control unit. In a transmission operation 138, the remote control unit 58 transmits the laser device command having no embedded Identification Number $ID_N$ to the laser device 10.

In a parallel command operation 140, the operator can select a laser device command by operation of one or more switches on a second (or more) remote control unit(s). In a parallel transmission operation 142, the second remote control unit transmits the laser device command having no embedded Identification Number $ID_N$ to the laser device. In a performing operation 144, the laser device performs the commanded action transmitted by either of the remote control devices.

Figure 7:
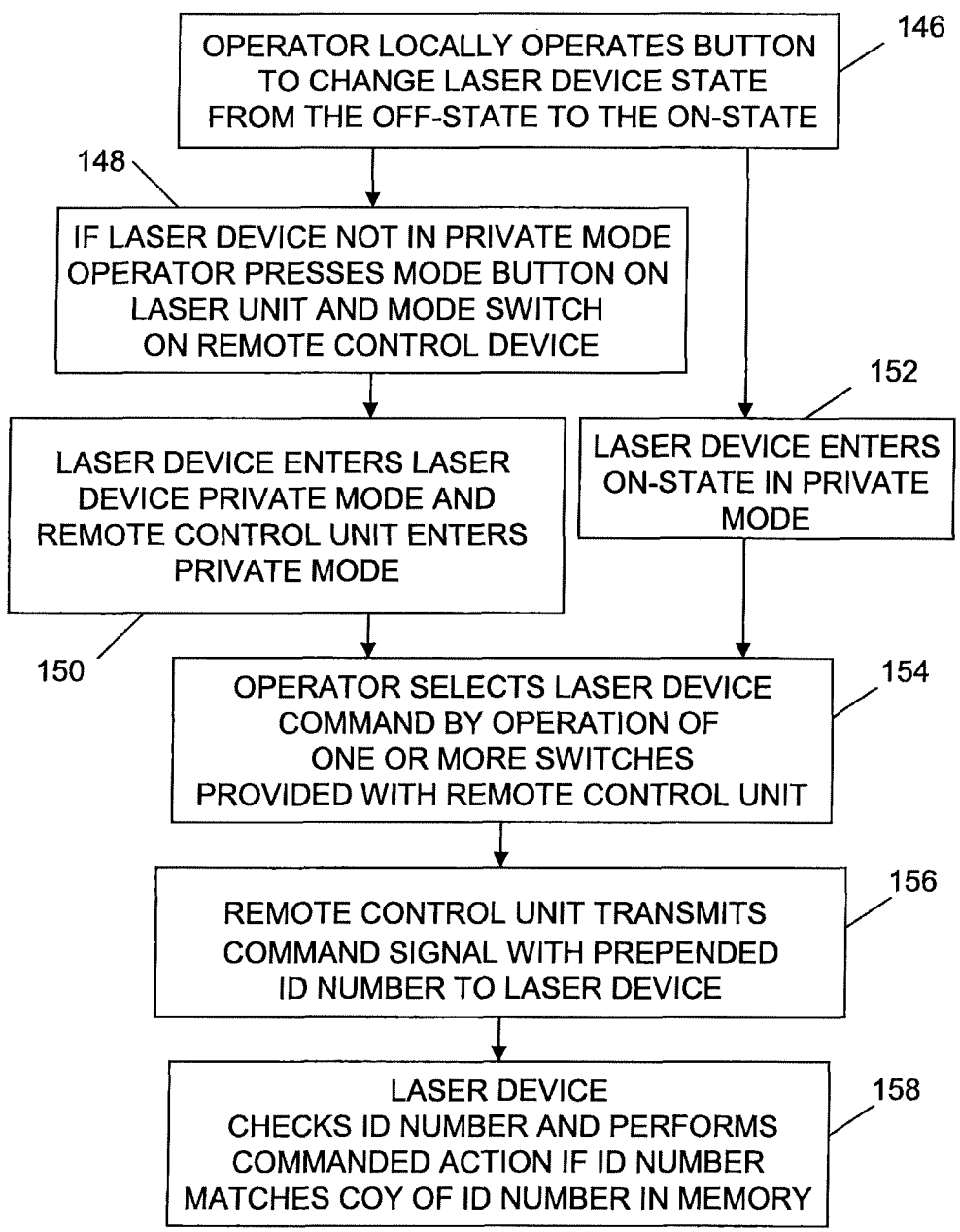
FIG. 7 is a diagram of operations performed in the private mode of operation.

Referring to FIG. 7, operation in the private mode can be accomplished as follows. In a first operation 146 the operator manually actuates a laser device mounted button to change the laser device operating state from the off-state to the on-state. In a mode selection operation 148, if the laser device does not energize in the laser device private mode, the operator simultaneously presses buttons of the laser device or switches on the remote control unit to switch the laser device to a laser device learn phase and to switch the remote control unit to a remote control unit teach phase. During a co-running time period of both the learn and teach phases, the remote control unit transmits an Identification Number $ID_N$ which is saved in the laser device. In a mode change operation 150, following the learn phase the laser device enters the laser device private mode, and following the teach phase the remote control unit enters the private mode. In a parallel operation 152, the laser device enters the on-state in the laser device private mode and no mode change is required.

With the laser device in the laser device private mode and the remote control unit in the private mode, in a following command selection operation 154, the operator selects a laser device command by actuation of one or more switches of the remote control device. The Identification Number $ID_N$ is automatically appended to the laser device command. In a transmission operation 156 the laser device command and the Identification Number $ID_N$ are both transmitted by the remote control unit to the laser device. In a performing operation 158, the laser device checks that the Identification Number $ID_N$ matches the Identification Number $ID_N$ copy that is saved in the laser device and performs the commanded operation only if the Identification Number $ID_N$ transmitted with the laser device command matches the Identification Number $ID_N$ copy that is saved in the laser device.

When the laser device 10 is in the standby-state for less than a second predetermined period of time which is longer than a first predetermined period of time, or is in the off-state for less than the second predetermined period of time, or is in a combination of the standby-state and the off-state for less than the second predetermined period of time, and is subsequently re-energized to the on-state, the laser device 10 automatically energizes in either the laser device public mode or the laser device private mode that was operational prior to changing states. According to several embodiments the first predetermined period of time is approximately four (4) hours and the second predetermined period of time is approximately eight (8) hours, however it should be apparent these time periods can be any time periods selected by the manufacturer. When the laser device is in the off-state for a third period of time greater than the second period of time, and is subsequently re-energized to the on-state, the laser device automatically energizes in the laser device public mode. According to several embodiments, the third period of time is any time period greater than eight (8) hours.

A communication protocol for remotely controlled devices of the present disclosure offers several advantages. A laser device can be programmed to receive and save a unique identification number generated by an infra-red beam generating remote control unit. Thereafter, the laser device will accept command signals from only an infra-red remote control device that transmits the identification number together with a command signal. The remote control device can include a random number generator to generate the unique identification number. The remote control device and the laser device can also be programmed to change operating modes back-and-forth between public and private operating modes by simultaneously depressing mode control switches on both the laser device and remote control unit. This reduces the possibility of unwanted operation of the remote control device and the laser device in different modes. The laser device can also be separately switched to a lock-out mode wherein the laser device will not respond to any signal from any remote control device.

Timers provided with both the laser device and the remote control unit allow either or both the laser device and the remote control unit to automatically switch to a different operating mode such as a reduced power standby mode, or for the laser device to completely downpower after a predetermined period of time elapses after a last button is operated on the laser device, or a last command signal is received. Buttons or switches on both the laser device and the remote control unit operate upon release to send a signal, therefore allowing mode change commands to be sent using common command buttons or switches, eliminating sending unwanted commands when a mode change command is desired.

What is claimed is:

1. A method for operating a laser device system, the laser device system including at least two laser devices and at least two wireless remote control units, the method comprising:
   adapting each of the laser devices to be operable in a laser device public mode and a laser device private mode that includes a stored private mode unique identifier; and
   configuring each of the remote control units to be operable in a public mode or a private mode, such that when the remote control units are in the public mode they are operable to command an operation of the laser devices that are in the laser device public mode and only when a remote control unit in the private mode provides the private mode unique identifier to the laser device in the laser device private mode and the laser device in the laser device private mode recognizes the private mode unique identifier is the remote control unit in the private mode operable to command the operation of the laser device in the laser device private mode.

2. The method of claim 1, further comprising:
   pre-configuring the laser devices to accept a first command signal from the at least one of the at least two remote control units when the at least one of the at least two laser devices is operational in the laser device public mode; and
   transmitting the first command signal from the at least one of the at least two remote control units operating in the public mode to the at least one of the at least two laser devices operable to command an operation of the at least one of the at least two laser devices.

3. The method of claim 1, further comprising generating the private mode unique identifier using a random number generator provided with the first remote control unit.

4. The method of claim 1, further comprising depressing a mode button on the laser device and a mode switch on the remote control unit to change from the laser device public mode to the laser device private mode and to change from the remote control unit public mode to the remote control unit private mode.

5. The method of claim 4, further comprising initiating a remote control unit teaching phase when the mode button and mode switch are depressed and released, the teaching phase operable to create and repeatedly transmit an identification number to the laser unit during a predetermined period of time.

6. The method of claim 5, further comprising initiating a laser device learning phase when the mode button and the mode switch are depressed and released, the learning phase operable to store an identification number during the predetermined period of time.

7. The method of claim 6, further comprising prepending the identification number to the first command signal when the mode switch of the remote control unit is depressed and released.

8. The method of claim 1, further comprising:
  starting a timer of the laser device to determine an elapsed time following entry into a standby state; and
  automatically switching the laser device into an off-state when a predetermined value of the elapsed time is reached.

\* \* \* \* \*